Patented Feb. 14, 1928.

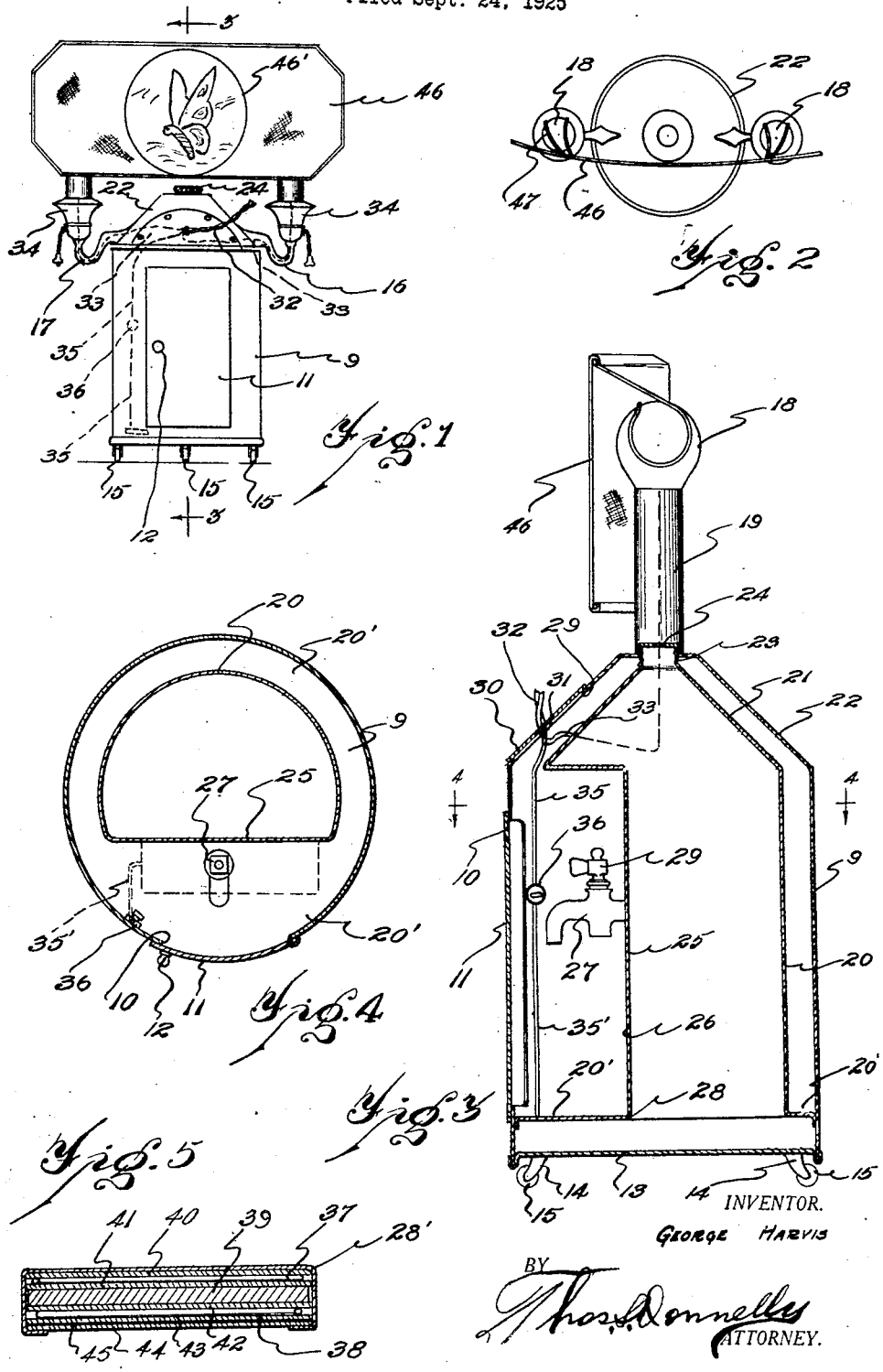

1,659,102

UNITED STATES PATENT OFFICE.

GEORGE HARVIS, OF DETROIT, MICHIGAN.

ELECTRIC WATER HEATER.

Application filed September 24, 1925. Serial No. 58,272.

My invention relates to a new and useful improvement in an electric water heater of a portable type and has for its object the provision of an electric heater of this class, which will be simple in structure, economical of manufacture, and highly efficient in use.

Another object of the invention is the provision of a portable heater of this class, so constructed and arranged as to be compact in form and adapted for carrying from place to place, so that it may be used for various purposes in various locations.

Another object of the invention is the provision in a heater of this class of a liquid container enclosed within a housing and so arranged as to provide the maximum space for containing liquid without departing from the compactness of structure.

Another object of the invention is the provision of an electric water heater of this class having an outer casing provided with a pair of brackets, upon which electric lights and ornaments may be mounted Another object of the invention is the provision in an electric water heater of this class of a liquid container having a heating element positioned in the base of the container, the base of the container being extended for forming a resting or supporting surface for the vessel into which the liquid is to be emptied.

Other objects will appear hereinafter.

The invention consists in the combination and arrangement of parts hereinafter described and claimed.

The invention will be best understood from a reference to the accompanying drawings, which form a part of this specification and in which, Fig. 1 is a front elevational view of the invention, Fig. 2 is a top plan view of the invention, Fig. 3 is an enlarged sectional view taken on substantially line 3—3 of Fig. 1, Fig. 4 is a sectional view taken on substantially line 4—4 of Fig. 2, Fig. 5 is a transverse sectional view of the heating element used in the invention, slightly enlarged.

As shown in the drawings, the invention comprises a subtantially cylindrical casing 9, made from suitable metal, having an opening 10 formed in the forward side thereof, for which is provided a swingably mounted door 11, provided with a conventional latching mechanism 12. Mounted on the base 13 of the casing are brackets 14, which carry rotatably mounted casters 15. The top 22 of the casing is formed conical-shaped, as shown in Fig. 1 and Fig. 3. Mounted on the top 22 and projecting outwardly therefrom, at opposite sides of the door, are brackets 16, which carry electric switch sockets 34 for supporting light bulbs 18, the sleeves 19 serving to space the light bulbs 18 from the top of the casing. Mounted within the casing 9 and spaced therefrom is a container 20 having its upper end converged as at 21 to lie parallel with the top 22 of the casing 9. A neck 23 is projected upwardly from the top of the container and exteriorly threaded for the reception of a cap 24, in which is formed a centrally disposed opening for permitting the escape of steam from the container 20. As shown in Fig. 3, and Fig. 4, the lower portion of the container 20 is angularly turned as at 20' and brought into engagement with the inner surface of the casing 9. This surface 20' serves as a supporting or resting surface for the receptacle which may be deposited in the recess 26 formed by insetting the front wall 25 of the container for receiving the liquid from the faucet 27, which is mounted in the inset wall 25. This faucet 27 is provided with a conventional stop cock.

As shown in the drawings, the forward portion of the top 22 of the casing is cut away as at 29 and a plate 30 is secured thereon by bolts, rivets or other suitable fastening means. This plate 30 is provided with an opening 31, through which may be passed electric wires 32. The wires 33 connect to the light bulbs 18 and the wire 35 connects to the switch 36, which is, in turn, connected by the wire 35' to the heating element which is positioned in a housing 28 mounted beneath the supporting surface 20'. Positioned in the housing 28, are two layers 37 and 38 of coiled wires, which are spaced by insulating strips 41 and 42 respectively from a metallic spacer 39. An insulating strip 40 serves to insulate the heating element coil 37 from the housing 28 and an insulating strip 43, as well as a strip of fireproofed paper 44 serve to insulate the heating element 38 from the metallic cover 45, which is slidably mounted in the housing 28'. This housing 28' is positioned in the housing 28 in such a way as to prevent access of liquid contained within the container thereto. A shade 46 is provided for mounting on the light bulbs 18, this shade having an ornamental design 46' formed on its outer face. Spring clips 47 of a conventional type serve to support the shade on the bulbs.

With a device of this class, a water heater is provided which may also be used as an ornament and which will serve as an efficient means for heating water when the same is desired in comparatively small quantities.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. An electric water heater of the class described, comprising a substantially cylindrical casing, converging at one end to form a top; a liquid container mounted in said casing and spaced therefrom, the side walls of said container being parallel to the side walls of said casing and angularly turned at the lower end for engaging said casing, to provide a compartment extending throughout the lower portion of said casing, the front wall of said container being inwardly offset to provide a recess for the reception of a receptacle; a delivery means mounted in said inwardly offset wall; and a heating element mounted in said container beneath said inwardly offset portion.

2. In an electric water heater of the class described, a casing having an opening formed in one side thereof; a swingably mounted closure for said opening; a liquid container mounted in said casing and spaced therefrom throughout the major portion of its area and engaging the inner surface of said casing, adjacent its lower end, one wall of said container being inwardly offset to provide a recess opposite said opening in said casing, the wall of said container, at said recess, forming a supporting surface for a receptacle; and a faucet mounted in said casing at said inwardly offset portion above said supporting surface; and heating means mounted in said container for heating liquid contained therein.

In testimony whereof, I have signed the foregoing.

GEORGE HARVIS.